United States Patent

Neufeld

(10) Patent No.: US 6,889,055 B1
(45) Date of Patent: May 3, 2005

(54) TECHNIQUE FOR REDUCING AVERAGE POWER CONSUMPTION IN A WIRELESS COMMUNICATIONS DEVICE

(75) Inventor: Arthur James Neufeld, San Diego, CA (US)

(73) Assignee: Qualcomm Inc., San Diego, CA (US)

(*) Notice: Subject to any disclaimer, the term of this patent is extended or adjusted under 35 U.S.C. 154(b) by 466 days.

(21) Appl. No.: 09/690,673

(22) Filed: Oct. 16, 2000

(51) Int. Cl.[7] .......................... H04Q 7/32; H04Q 7/20
(52) U.S. Cl. .................. 455/458; 455/574; 455/572; 455/343.1; 455/343.2; 455/550.1; 340/7.1; 340/7.2; 340/7.32; 340/7.33
(58) Field of Search .................... 455/343.1, 343.2, 455/343.3, 343.4, 343.5, 343.6, 344, 571, 403, 575.1, 90.1, 90.2, 422.1, 426.1, 572, 574, 550, 343, 502, 458, 517, 515, 422, 466, 67.3, 67.1; 340/7.1, 7.2, 7.28, 7.22, 539, 7.32, 7.33; 375/147, 146, 135, 136, 220, 367

(56) References Cited

U.S. PATENT DOCUMENTS

| | | |
|---|---|---|
| 5,228,054 A | 7/1993 | Rueth et al. |
| 5,491,718 A | 2/1996 | Gould et al. |
| 5,910,944 A | 6/1999 | Callicotte et al. |
| 6,088,602 A | 7/2000 | Banister |
| 6,212,398 B1 * | 4/2001 | Roberts et al. ............. 455/502 |
| 6,369,751 B1 * | 4/2002 | Naruse ...................... 455/502 |
| 6,453,181 B1 * | 9/2002 | Challa et al. ............... 455/574 |
| 6,473,607 B1 * | 10/2002 | Shohara et al. ............ 455/343 |

FOREIGN PATENT DOCUMENTS

WO 0004738 1/2000

* cited by examiner

Primary Examiner—Keith T. Ferguson
(74) Attorney, Agent, or Firm—Philip R Wadsworth; Charles D. Brown; Kenyun Jenkes

(57) ABSTRACT

A method and system of reducing average power consumption in a wireless communication device (WCD) that operates in sleep and awake modes during monitoring of a slotted paging channel includes the steps of providing a plurality of counters; establishing a roll over point for each counter at a predetermined offset relative to each other counter; identifying a timing, point for at least one roll over point; and transitioning between the sleep and awake modes during the occurrence of an identified timing point.

20 Claims, 10 Drawing Sheets

TECHNIQUE FOR REDUCING AVERAGE POWER CONSUMPTION IN A WIRELESS COMMUNICATIONS DEVICE

CROSS-REFERENCE TO RELATED APPLICATIONS

The present invention is related to the following application of common assignee: Technique for Reduction of Awake Time in a Wireless Communications Device Utilizing Slotted Paging (application Ser. No. 09/118,750, filed Jul. 17, 1998). The '750 application is incorporated by reference herein in its entirety.

BACKGROUND OF THE INVENTION

I. Field of the Invention

The present invention relates generally to wireless communications systems. More specifically, the present invention relates to a method and system for reducing power consumption in a wireless communications device.

II. Description of the Related Art

Wireless communications devices (WCDs) typically operate in either an active state or a standby state. In an active state (sometimes referred to as a call state), a WCD exchanges user information on a payload traffic channel, such as a radio frequency (RF) channel used for voice and/or data calls. However, when user information is not being exchanged, a WCD operates in a standby state. In a standby state, a WCD monitors a paging channel for paging channel messages transmitted by other nodes within a wireless communications system (WCS), such as base stations, satellites, and/or other WCDs. Examples of paging channel messages include ring messages that are precursors to call initiation (i.e., active state operation), and messages that update a WCD's operational parameters.

One type of paging channel is a slotted paging channel. Slotted paging channels include a plurality of periodic time slots, wherein each WCD in a WCS is assigned to one of the plurality of time slots. A WCD monitors paging channel transmissions during its assigned time slot. Moreover, messages to a particular WCD are transmitted only during the time slot assigned to that particular WCD. Since a WCD may receive paging channel messages during its assigned time slot, it exists in an "awake" mode during this slot. During awake mode operation, components within a WCD are configured for paging channel message reception. A WCD typically begins awake mode operation before the beginning of its assigned paging channel time slot. Furthermore, a WCD may continue to operate in this awake mode after its assigned time slot if a received paging channel message requires the WCD to perform additional actions, such as receive additional transmissions.

Once there are no additional active mode actions to be performed, a WCD may operate in a "sleep" mode during the interval between successive occurrences of its assigned slot. During sleep mode operation, a WCD may conserve energy by shutting off power to some of its components. For example, a WCD may halt operation of certain components used for reception and processing that are not needed during time intervals when no information will be directed to that particular WCD. This halting typically "freezes" internal processes, such as counters and sequence generators. In addition, this halting may also power down certain other components.

In WCSs that operate according to CDMA standards, such as IS-95A and IS-95B (referred to herein as IS-95 systems), information, such as paging channel traffic, is sent between transmitting nodes (transmitters) and receiving nodes (receivers) in the form of symbol sequences. This information is interleaved, encoded, spread according to pseudonoise (PN) sequences, and modulated into radio frequency (RF) signals that are transmitted for reception by WCDs, such as mobile telephones. Upon reception, these signals are converted into baseband signals, despread, deinterleaved, and decoded into the originally transmitted information symbol sequences.

Transmissions between a transmitter and a receiver in a CDMA system are spread by a PN sequence in the transmitter and despread by the same PN sequence in the receiver. In IS-95 systems, these PN sequences have lengths of $2^{15}$ symbols ("chips") and have a chip rate of 1.228 MHz. Therefore, the PN sequence period is 26.667 milliseconds. For proper reception of information, PN sequence generation processes in a transmitter must be aligned with PN sequence generation processes in the receiving WCD.

In such systems, interleaving is based on an interleaving time frame, such as 20 milliseconds in IS-95 systems. For proper reception of information in a WCD, both the interleaving process at a transmitter and the deinterleaving process at the receiving WCD must be also synchronized with one another.

In addition, a WCD needs to maintain internal synchronization between its PN sequence despreading process(es) and its deinterleaving process(es). That is, when a WCD transitions from a sleep mode to an awake mode, its PN sequence despreading processes and deinterleaving processes must reinitiate operation as if the WCD was awake during intervening sleep mode intervals. In essence, the WCD must wake up and continue to operate as if it never missed a beat.

One technique of ensuring that such internal synchronization occurs involves employing sleep mode intervals that are equal in time to an integer multiple of both the interleaving time frame and the PN sequence period. According to this approach, when WCD transitions from a sleep mode to an awake mode, its processes resume operation at the same points in the PN sequences and interleaving frames in which they were operating when the preceding transition to sleep mode occurred. In addition, since this transition occurs at an integer multiple of both the interleaving time frame and the PN sequence period, these processes are internally synchronized.

The smallest integer multiple of both the interleaving time frame and the PN sequence period is their least common multiple. In the case of IS-95 systems, this least common multiple equals 80 milliseconds (i.e., three times the 26.667 millisecond PN sequence period and four times the 20 millisecond interleaving time frame). Conventional approaches to sleep and awake mode timing employ this least common multiple approach. Therefore, in IS-95 systems, sleep mode intervals according to this approach are constrained to a coarse granularity of 80 milliseconds.

For a WCD powered by a battery or a fixed energy source, time in a standby state can be increased by reducing the device's average current consumption. One way to achieve this reduction is to increase the duration of the sleep mode interval while reducing the duration of the awake mode interval. Generally, the fraction of time spent in an awake mode is much smaller than the amount of time spent in a sleep mode. However, since current consumed in an awake mode is generally several times greater than the current consumed during a sleep mode, any reduction in the amount of time spent in the awake mode can result in a significant improvement in current consumption and standby time.

Accordingly, what is needed is a technique that reduces the amount of time a WCD spends in an awake mode, thereby increasing the device's operational time.

SUMMARY OF THE INVENTION

The present invention is directed to a system and method for extending the operational time of a WCD, wherein the WCD is capable of operating in sleep and awake modes while monitoring a slotted paging channel. A method of the present invention comprises the steps of distributing a plurality of counters so that each counter rolls over at a predetermined offset relative to each other counter; providing a plurality of timing points that occur at the roll over times for the plurality of counters; and transitioning between sleep and awake mode operation at the occurrence of one of the plurality of timing points.

The distributing step may include the step of spacing each of the plurality of counters at substantially equal time increments around a PN sequence period. This step may also include the step of synchronizing each of the plurality of counters to a corresponding pseudonoise (PN) sequence generator. Such synchronization involves shifting each of the corresponding PN sequence generators by an offset, thereby enabling the demodulation of a corresponding multipath transmission component.

The transitioning step may include the step of commencing awake mode operation at a predetermined number of timing points before the beginning of a paging channel slot assigned to the WCD. For instance, this step may involve commencing awake mode operation two timing points before the beginning of such a paging channel slot.

Moreover, the transitioning step may include the step of commencing sleep mode operation at a predetermined number of timing points after the beginning of a paging channel slot that is assigned to the WCD. In addition, this step may include the step of commencing sleep mode operation at a first occurring timing point after the WCD determines that there is no paging traffic to decode during such a paging channel slot.

The present invention advantageously achieves a finer granularity of sleep mode interval durations, thereby extending the length of sleep mode intervals and increasing WCD operational time.

The present invention also advantageously maintains the quality of received signals. Some approaches extend sleep mode interval durations to a certain degree by removing a demodulation finger from the WCD demodulation process. Such removal of demodulation fingers may degrade the quality of received signals. In contrast, the present invention maintains signal quality by retaining all demodulation fingers in the demodulation process.

BRIEF DESCRIPTION OF THE DRAWINGS

The present invention will be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENTS

I. Introduction

The present invention is directed to a technique for achieving finer granularity of sleep mode interval durations over conventional techniques. This finer granularity is achieved through the use of timing points that provide a WCD with more frequent opportunities to transition between sleep and awake mode operation. As a result of this finer granularity, a WCD may extend the length of sleep mode intervals, thereby increasing its operational time. These timing points are based on counters, such as demodulation finger counters and combiner counters, as will be described herein with reference to an exemplary WCD.

II. Wireless Communications System

Figure 1:
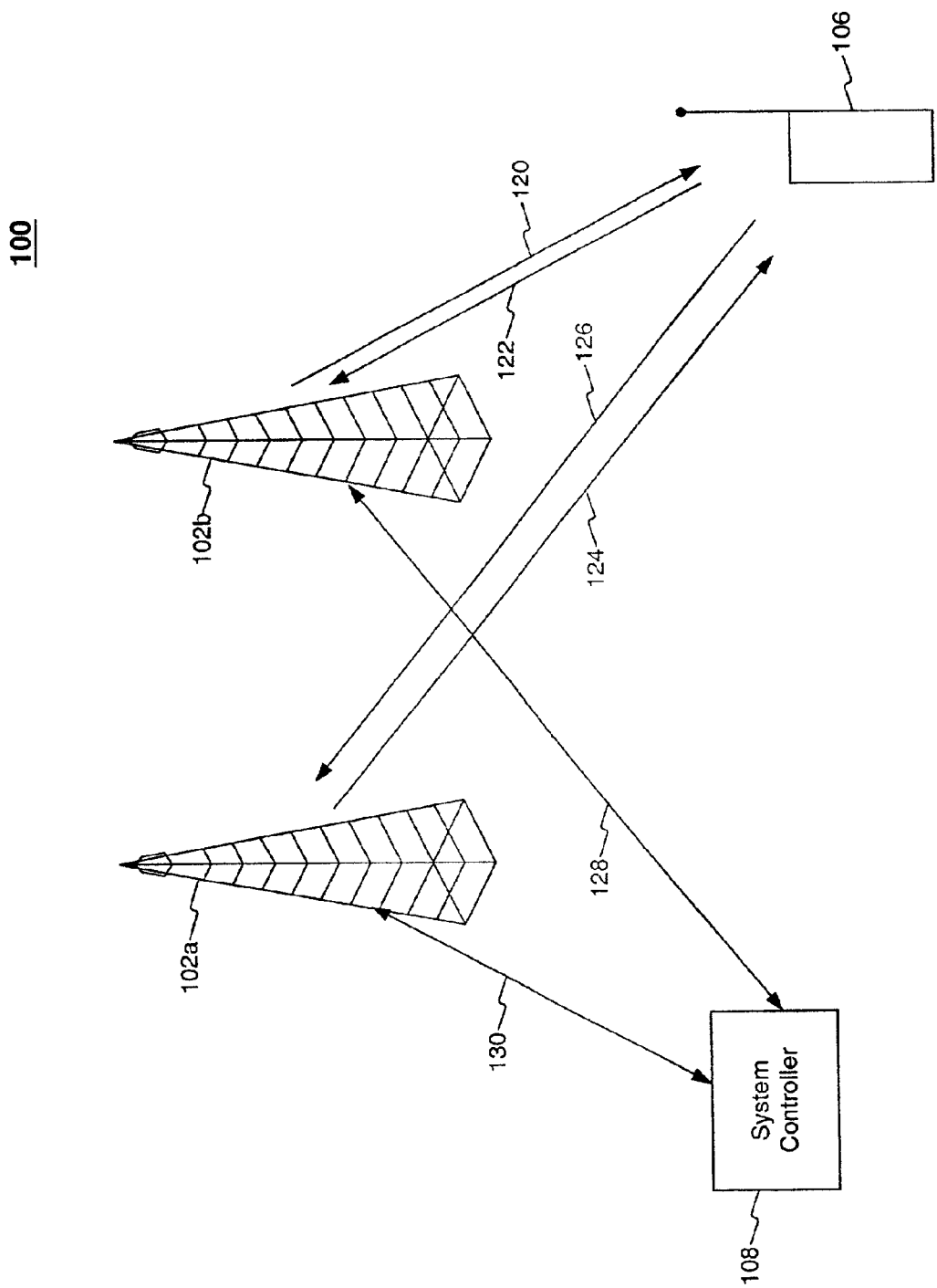
FIG. 1 is an illustration of an exemplary wireless communications system (WCS)

FIG. 1 is an illustration of an exemplary wireless communications system (WCS) 100. Exemplary WCS 100 includes first and second base stations 102a and 102b, a wireless communications device (WCD) 106, and a system controller 108.

In many WCSs, multipath transmissions occur. Multipath transmissions are individual RF wavefronts, also referred to herein as multipath components, that stem from a transmission by a single RF transmitter. Multipath transmission may be caused by wavefront reflections as well as other physical occurrences. To a receiving device, such as WCD 106, each multipath component appears identical, except for a distinct time shift, and usually a different signal strength. In a CDMA system, if these multipath component time shifts are greater than the duration of one PN chip, then the individual multipath components can be independently distinguished and combined into a single information stream. Such combining techniques may increase overall signal to noise ratios, thereby reducing the probability of symbol errors.

In IS-95 systems, paging channels carry signals that are encoded, interleaved, spread, and modulated, and transmitted by base stations 102 to WCD(s) 106.

Figure 2:
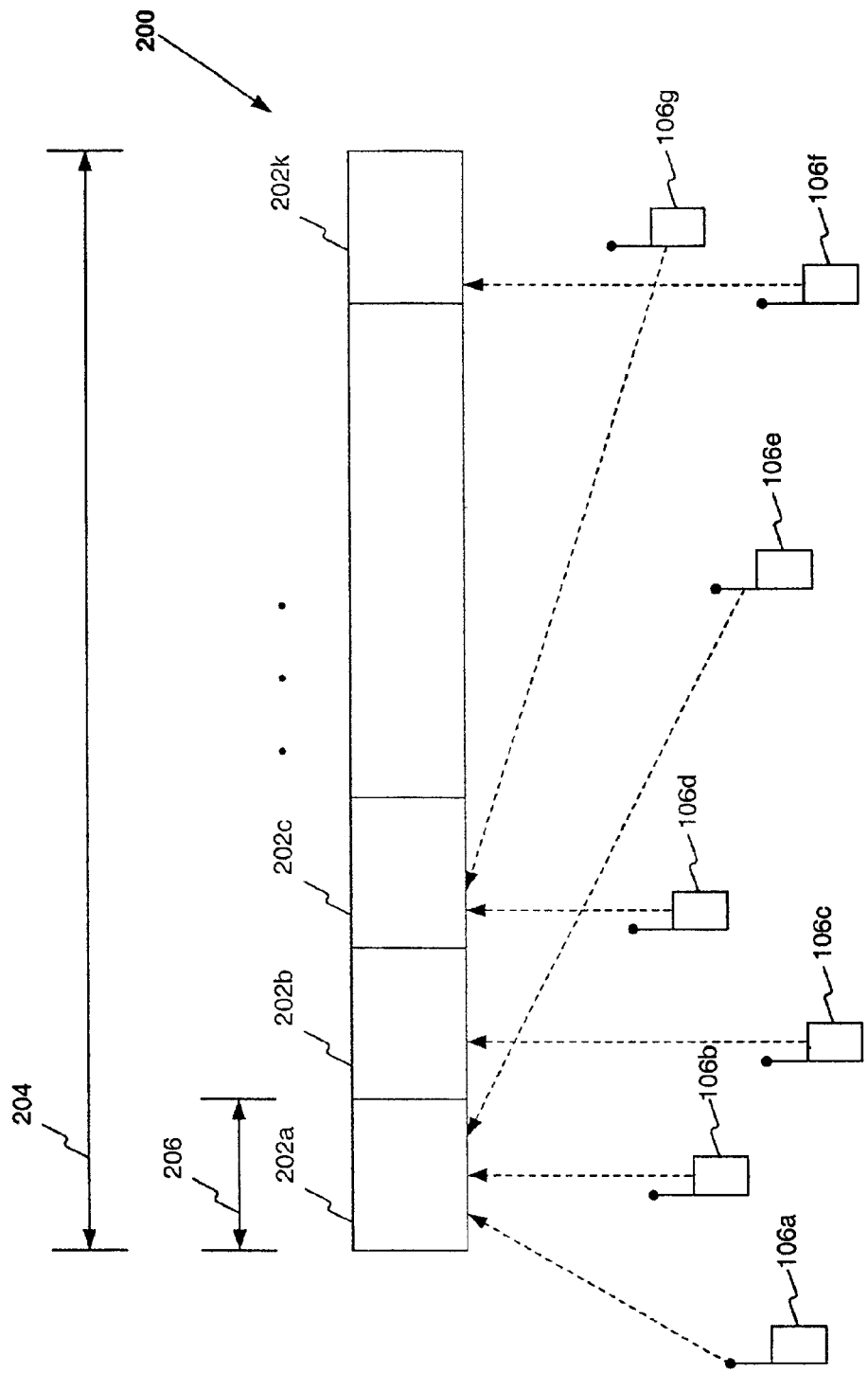
FIG. 2 is a illustration of an exemplary paging channel frame.

A paging channel includes a repeating frame that is divided into a plurality of slots that have a fixed duration. FIG. 2 is an illustration of an exemplary paging channel frame 200. Paging channel frame 200 includes a plurality of paging channel slots 202. Each paging channel slot 202 has a paging channel duration 206. In IS-95 systems, paging channel slot duration 206 is 80 milliseconds. Paging channel frame 200 has a paging channel frame duration 204. As illustrated in FIG. 2, a plurality of WCDs 106 are each individually assigned to a particular paging channel slot 202. For instance, WCDs 106a, 106b, and 106e are assigned to paging channel slot 202a; WCD 106e is assigned to paging channel 202b; WCDs 106d and 106g are assigned to paging channel slot 202c; and so on.

III. Wireless Communications Device

Figure 3A:
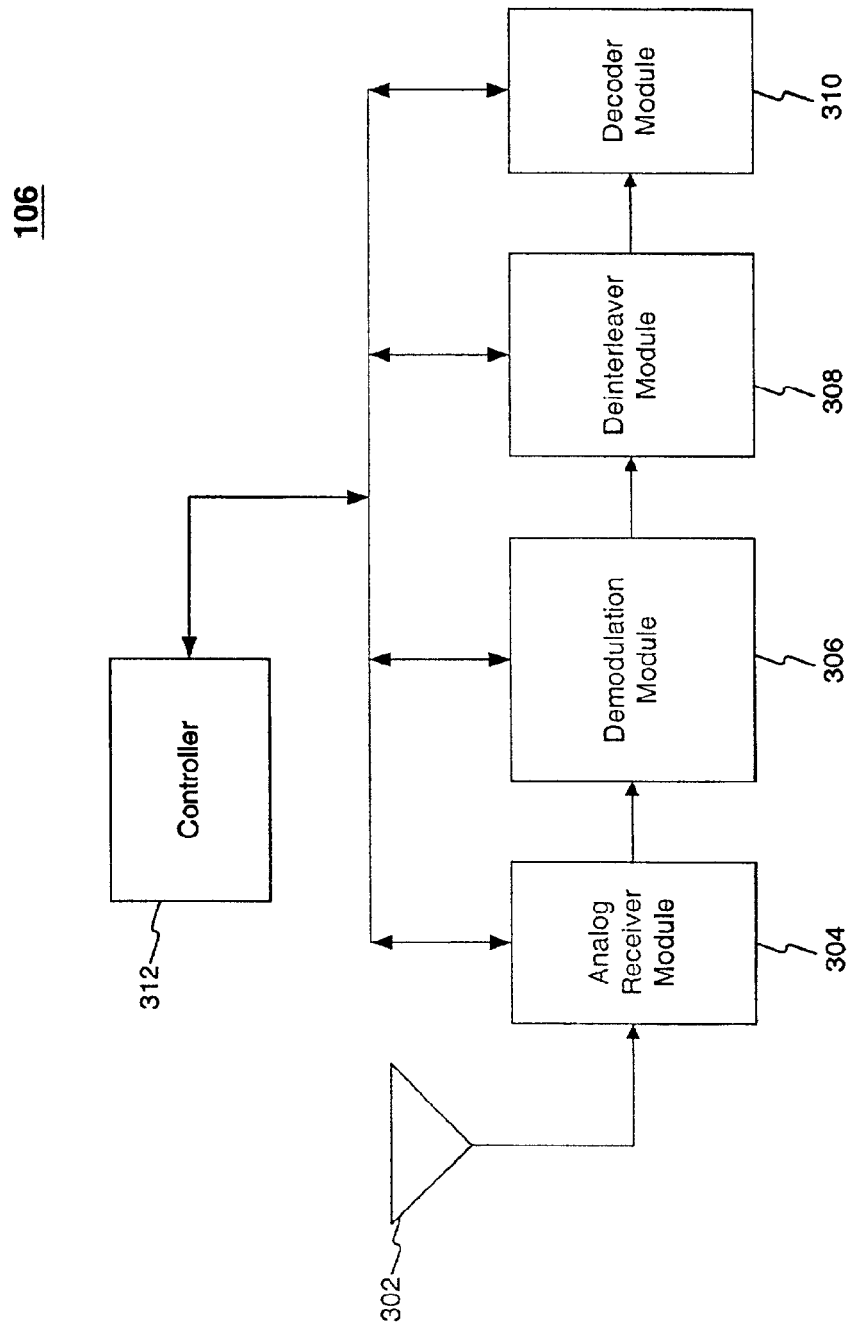
FIG. 3A is a functional block diagram of an exemplary slotted paging channel receiving portion of a WCD.

FIG. 3A is a functional block diagram of an exemplary slotted paging channel receiving portion of WCD 106. As illustrated in FIG. 3A, WCD 106 includes an antenna segment 302, an analog receiver module 304, a demodulation module 306, a deinterleaver module 308, a decoder module 310, and a controller 312.

Antenna segment 302 receives radio frequency (RF) transmissions from base stations 102a and/or 102b. Antenna segment 302 forwards these transmissions as electrical signals to analog receiver module 304. In addition, antenna segment 302 may receive electrical signals for wireless transmission from a transmit power amplifier (not shown) within WCD 106. Accordingly, to enable the simultaneous transmission and reception of RF signals through a single antenna within antenna segment 302, antenna segment 302 may include a diplexer, as would be apparent to persons skilled in the relevant art(s).

Analog receiver module 304 receives electrical signals from antenna segment 302 within an RF frequency band. In addition, analog receiver module 304 down converts these RF signals into an intermediate frequency (IF) band. This down conversion may be performed by frequency down conversion techniques that are apparent to persons skilled in the relevant art(s). In an embodiment, analog receiver module 304 may also filter these IF signals in accordance with a specific bandwidth.

Moreover, analog receiver module 304 converts the IF signals into corresponding digital signals using analog to digital (A/D) conversion techniques, as would be apparent to persons skilled in the relevant art(s). This A/D conversion is performed at a sampling rate that is an integer multiple of the pseudonoise (PN) chip rate employed in WCS 100. However, other sampling rates may also be used. After A/D conversion is performed, the resultant digitized IF signals are transferred to demodulation module 306.

Demodulation module 306 receives digitized IF signals from analog receiver module 304 and converts these digitized IF signals into one or more baseband information symbol sequences. Demodulation module 306 generates a plurality of baseband information symbol sequences wherein each information symbol sequence corresponds to a particular multipath transmission component. Demodulation module 306 combines this plurality of sequences into a single information sequence to decrease the probability of symbol errors. These sequences may be combined according to signal combining techniques known to persons skilled in the relevant art(s). Further details regarding the performance and functionality of demodulation module 306 are described herein with reference to FIG. 3B. Once these sequences are combined, demodulation module 306 transfers a single information symbol sequence to deinterleaver module 308.

Deinterleaver module 308 receives a baseband information symbol sequence from demodulator module 306 and divides segments of this symbol sequence into a plurality of segments known as deinterleaver frames, wherein each deinterleaver frame has a predetermined duration. IS-95 systems employ deinterleaver frames that are 20 milliseconds in duration. Deinterleaver module 308 arranges these frames according to an interleaving/deinterleaving scheme used by WCS 100, thereby producing a deinterleaved information symbol sequence. In particular, deinterleaver module 308 performs an inverse of an interleaving function performed by one or more transmitters within WCS 100. Further details regarding interleaving and deinterleaving are included in IS-95A and IS-95B. Deinterleaver module 308 transfers this deinterleaved symbol sequence to decoder module 310.

Decoder module 310 receives a deinterleaved symbol sequence from deinterleaver module 308 and decodes this sequence. Decoder module 310 decodes in accordance with a forward error correction coding (FEC) scheme used by WCS 100. Decoder module 310 may include a Viterbi decoder. Further details regarding Viterbi encoding and decoding are included in IS-95A and IS-95B. However, decoder module 310 may decode according to other coding schemes (e.g., cyclical and/or block error correction coding schemes) that are known to persons skilled in the relevant art(s).

Decoder module 310 transfers a decoded symbol sequence to controller 312. However, decoder module 310 may alternatively, or additionally, transfer decoded sequences to other component(s) (not shown) within WCD 106.

Controller 312 is operatively coupled to analog receiver module 304, demodulation module 306, deinterleaver module 308, and decoder module 310. Controller 312 receives decoded information symbol sequences from decoder module 310. These decoded information symbol sequences may comprise one or more paging messages received from WCS 100. Controller 312 generates responses to these paging messages and sends them to a transmission segment (not shown) of WCD 106 that transmits these responses to WCS 100 through antenna segment 302.

Controller 312 includes processor(s), memory, oscillator (s), clock(s), and/or counter(s) (not shown) that drive the operation of various components within WCD 106. For example, controller 312 may include an oscillator that tunes down conversion functionality within analog receiver module 304, and counters that control the timing and duration of sleep and awake mode intervals when WCD 106 is operating in an idle state. In addition, controller 312 may include counters to synchronize deinterleaving, combining, and decoding functions performed by demodulation module 306, deinterleaver module 308, and decoder module 310.

Figure 3B:
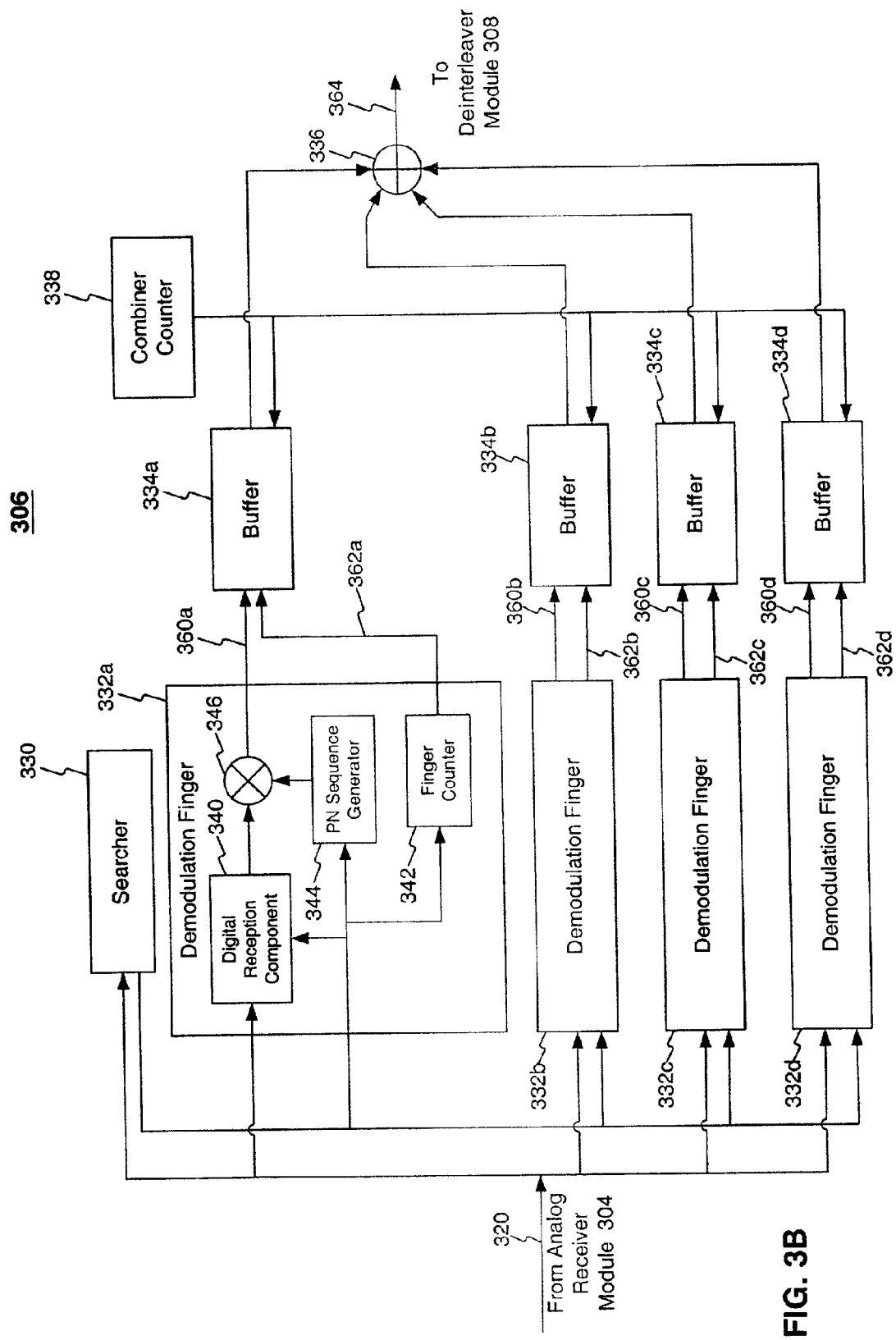
FIG. 3B is an illustration of demodulation module.

FIG. 3B is an illustration of demodulation module 306 in greater detail. Demodulation module 306 includes a searcher 330, a plurality of demodulation fingers 332, a plurality of corresponding buffers 334, a combiner 336, and a combiner counter 338. As described herein, demodulation module 306 receives a signal 320 from analog receiver module 304. Signal 320 is a digitized IF signal that may comprise a plurality of multipath components. Demodulation module 306 extracts one or more of these multipath components, and despreads them with a PN sequence to produce corresponding symbol sequences. In addition, demodulation module 306 employs buffers 334 to time align these symbol sequences for combining at combiner 336. Combiner 336 produces a combined symbol sequence 364 that is sent to deinterleaver module 308.

Searcher 330 correlates samples of signal 320 at a plurality of PN sequence offsets to acquire timing references for one or more of the plurality of multipath components. After these timing references are acquired, each of the one or more multipath components is assigned to a corresponding demodulation finger 332. FIG. 3B shows four demodulation fingers 332a through 332d. However, it would be apparent to persons skilled in the relevant art(s) that any number of demodulation fingers 332 may be used.

Each demodulation finger 332 includes a digital reception component 340, a finger counter 342, a PN sequence generator 344 and a multiplier 346. Digital reception component 340 converts signal 320 into a baseband symbol sequence. PN sequence generator 344 generates a PN sequence that is synchronized with the corresponding multipath component's PN sequence. At multiplier 346, this synchronized PN sequence is multiplied, or correlated, with the baseband symbol sequence output by digital reception component 340 to produce a despread symbol sequence.

Within each particular demodulation finger 332, finger counter 342 increments each time a PN chip is generated by PN sequence generator 344. Finger counter 342 is a circular counter having the length of the PN sequence used by PN sequence generator 344. Thus, finger counter 342 "rolls over" every time the corresponding PN sequence generator 344 completes a PN sequence period. As illustrated in FIG. 3B, finger counter 342 and PN sequence generator 344 are shown receiving synchronization commands and/or signals from searcher 330. In a further embodiment, these commands and/or signals may be received from controller 312, as is shown in FIG. 3A.

For each demodulation finger 332, there is a corresponding buffer 334. Each buffer 334 receives a despread symbol sequence 360 from its corresponding demodulation finger 332. The output of finger counter 342 is used as a write index 362 for corresponding buffer 334. Each buffer 334 receives a despread symbol sequence that corresponds to a distinct multipath component. Since each multipath component has a different propagation delay, like-indexed symbols from each of the demodulation fingers 332 are written into the corresponding buffer 334 at different times.

Each of the buffers 334 outputs like-indexed symbols in a time-aligned manner. To achieve this time alignment, each buffer 334 has a buffer depth. This buffer depth enables the collection of symbols while delays necessary for time-alignment are incurred. This buffer depth is eight symbols. Buffer depths of any number of symbols may be employed, as would be apparent to persons skilled in the relevant art(s).

Symbol output from buffers 334 is controlled by combiner counter 338, which functions as a read index into each buffer 334. Combiner counter 338, like each finger counter 342, is a circular counter having the length of the PN sequence employed by each of the PN sequence generators 344. Combiner counter 338 is delayed by a certain number of PN chips from a particular finger counter 342. (This number is not constant, although it tends towards a fixed constant value. In the steady state, the number is constant.) This particular finger counter 342 corresponds to the demodulation finger 332 that tracks the multipath component having the smallest propagation delay (i.e., the earliest arriving multipath).

Upon output from each of the buffers 334, the time-aligned symbol sequences are summed by combiner 336, thereby producing a single symbol sequence 364. Before summation by combiner 336, each individual time aligned sequence may be weighted and/or processed in manners that optimize the quality of combined symbol sequence 364, as would be apparent to persons skilled in the relevant art(s).

IV. Finger Timing Schemes

Figure 4B:
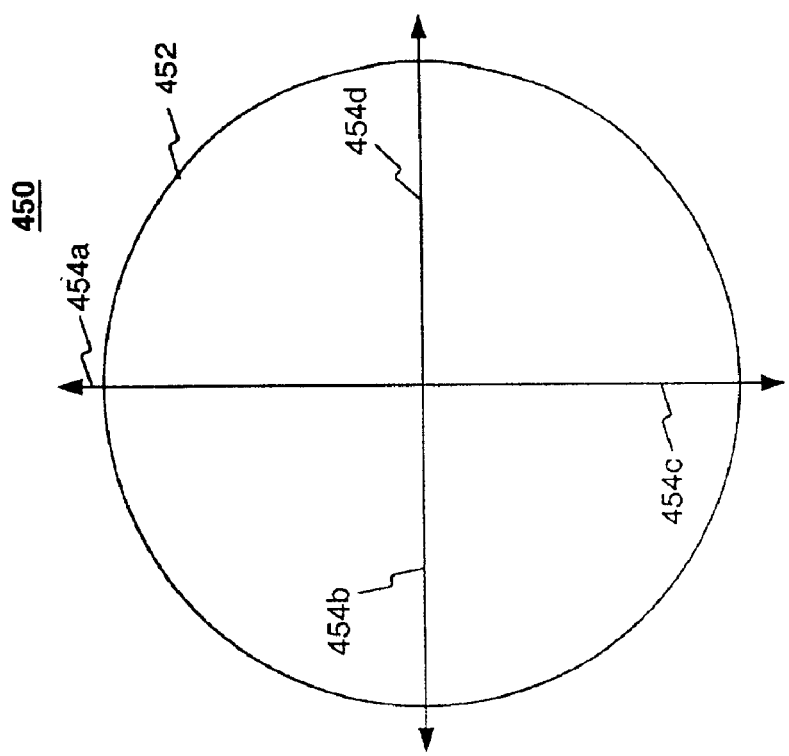
FIGS. 4A and 4B are phasor diagrams that illustrate timing relationships according to two different finger timing schemes.
Figure 4A:
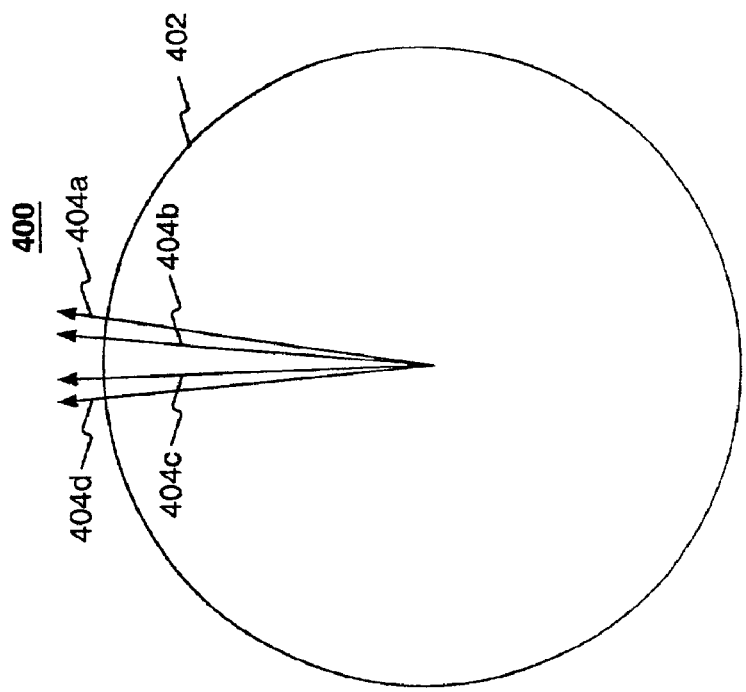

As described herein, the sequences generated by PN sequence generators 344 are periodic, repeating sequences. Thus, the timing relationships between these sequences may be illustrated using phasor diagrams. As such, FIGS. 4A and 4B are phasor diagrams employing a clockwise rotation convention that illustrate the timing relationships between the sequences generated by PN sequence generators 344a–d according to two different finger timing schemes. As described herein, each PN sequence generator 344 is synchronized to a particular multipath component received by WCD 106 through antenna segment 302. The phasor diagrams of FIGS. 4A and 4B illustrate two different approaches for tracking the same multipath components. The approach illustrated in FIG. 4A involves PN sequences having phases that are closely clustered together. In contrast, the approach illustrated in FIG. 4B involves PN sequences having greater phase distribution.

FIG. 4A is a first phasor diagram 400 that illustrates PN sequence timing relationships according to a first approach. Phasor diagram 400 includes a PN circle 402 and a plurality of PN sequence phasors 404a–d. PN circle 402 represents a continuous cycle of PN sequences. Each of phasors 404a–d represents a PN sequence that is generated by a corresponding PN sequence generator 344. The timing relationship between phasors 404a–d within a PN sequence period time window follow a particular order. In particular, phasor 404a leads phasor 404b. In turn, phasor 404b leads phasor 404c, and phasor 404c leads phasor 404d. Accordingly, the PN sequence represented by phasor 404a is referred to herein as a leading PN sequence. Since each PN sequence is synchronized with a particular multipath component, the leading PN sequence is synchronized with the multipath component having the smallest propagation delay (i.e., the earliest arriving multipath).

FIG. 4B is a second phasor diagram 450 that illustrates PN sequence timing relationships according to a second approach. Phasor diagram 450 includes a PN circle 452 and a plurality of PN sequence phasors 454a–d. PN circle 452 represents a continuous cycle of PN sequences. Each of phasors 454a–d represents a PN sequence that is generated by a corresponding PN sequence generator 344.

Unlike phasors 404, which are clustered together, each phasor 454 is separated by substantially 90 degrees (i.e., one-quarter of a PN sequence period). Despite this greater phase separation, the PN sequences represented by phasors 454a–d are also able to track the same multipath components that are tracked in the approach described above with reference to FIG. 4A. This tracking of multipath components despite this 90 degree phase separation is enabled through PN sequence shifting techniques.

PN sequence shifting techniques allow a PN sequence to be shifted by a desired number of PN chips. A PN sequence generator 344 may instantaneously produce a shift upon the input of a shift mask. Further details regarding PN sequence shifting techniques and shift masks are described in U.S. Pat. No. 5,228,054, entitled "Power-of-Two Length Pseudo-Noise Sequence Generator with Fast Offset Adjustment," issued Jul. 13, 1993, assigned to the assignee of the present invention (incorporated herein by reference in its entirety). For a particular PN sequence generator 344, shifting the corresponding PN sequence does not affect when corresponding finger counter 342 rolls over. Therefore, phasors 454 maintain their phase separation notwithstanding the PN sequence shift.

Combiner counter 338 is synchronized to a finger counter 342. For example, combiner counter 338 may be delayed by a predetermined number of PN chips from a finger counter 342 that corresponds to a leading PN sequence, as described herein with reference to FIGS. 4A and 4B. Combiner counter 338 rolls over once every PN sequence period (e.g., once every 26.667 milliseconds in IS-95 systems).

At a certain moment, combiner counter 338 may be resynchronized to another of finger counters 342. While still rolling over once every PN sequence period, a resynchronized combiner counter 338 will roll over at moments that are shifted in time by a certain amount.

Accordingly, when WCD 106 operates according to the finger timing scheme described herein with reference to FIG. 4A, a resynchronization of combiner counter 338 will create a shift in its roll over times. This shift will have a magnitude that is commensurate with multipath component delays. These magnitudes result from finger counters 342 being clustered together on PN circle 402.

In contrast, when WCD 106 operates according to the finger timing scheme described herein with reference to FIG. 4B, a resynchronization of combiner counter 338 will create a greater shift in its roll over times. Such substantial shifts will occur because finger counters 342 are distributed in phase across PN circle 452. For example, in FIG. 4B, where phasors 454 represent four distinct finger counters 342 distributed in a substantially equal time increments across PN circle 452, a finger counter 342 "rolls over" approximately once every quarter of a PN sequence period (e.g., once every 6.667 milliseconds in IS-95 systems).

V. Sleep and Awake Mode Transitions

WCD 106 employs the finger timing scheme as described herein with reference to FIG. 4B. Accordingly, a plurality of phasors are distributed in a substantially equal manner across PN circle 452. Each phasor represents a PN sequence generated by a corresponding finger counter 342. In a particular implementation of this timing scheme, four finger counters 342 are phase distributed in a substantially equal manner across PN circle 452. Thus, according to this implementation, a finger counter 342 rolls over approximately once every fourth of a PN sequence period (e.g., once every 6.667 milliseconds in IS-95 systems).

Combiner counter 338 is synchronized to a particular finger counter 342. Combiner counter 338 is delayed by a certain number of PN chips from a particular finger counter 342. This particular finger counter 342 may correspond to a PN sequence generator 344 generating a leading PN sequence.

Figure 5:
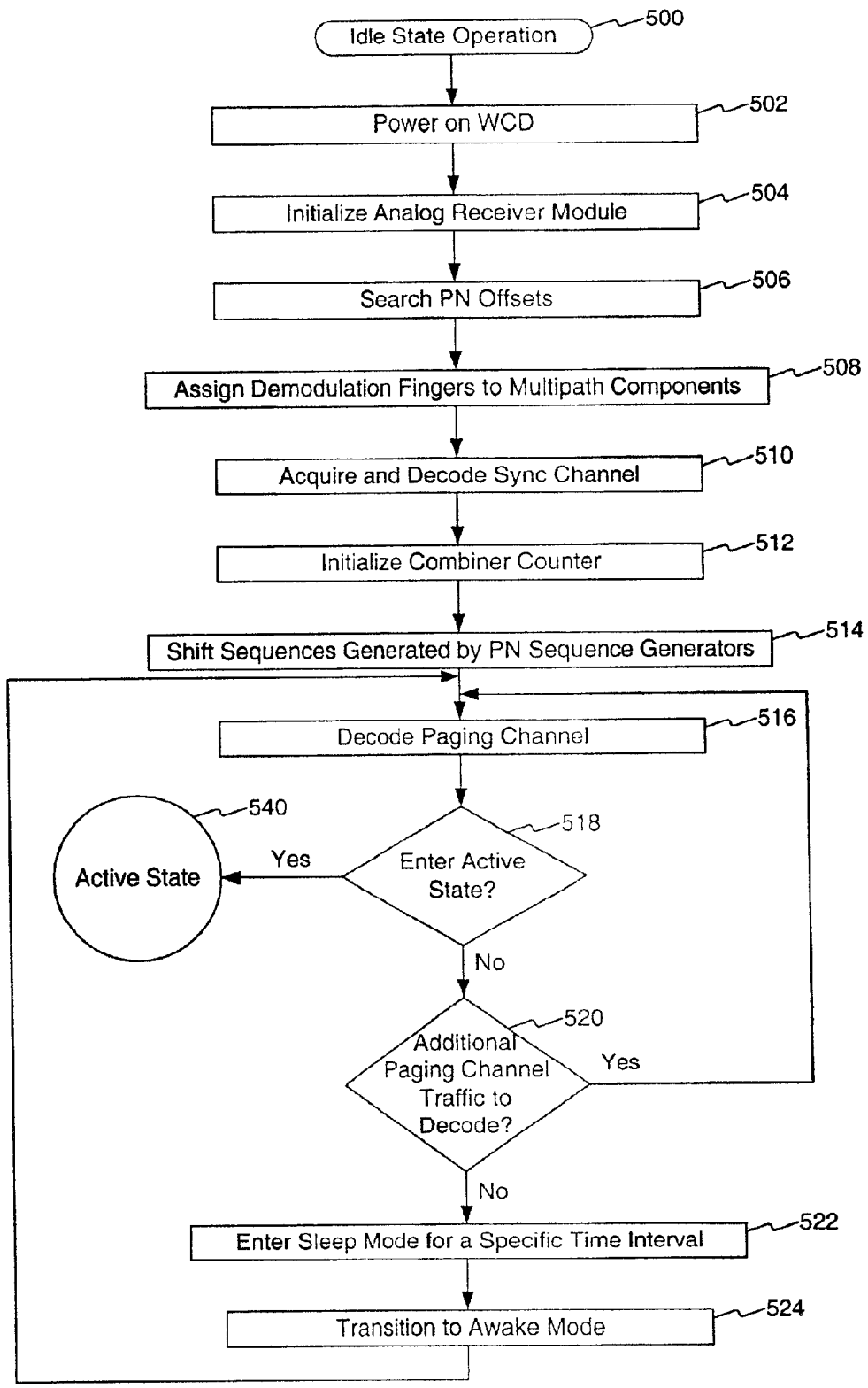
FIG. 5 is a flowchart illustrating an idle state operation of a WCD.

FIG. 5 is a flowchart illustrating an operation of WCD 106 during idle state. This operation begins with a step 502. In this step, WCD 106 is powered on. WCD 106 may be powered with a finite energy source, such as a battery.

Next, in a step 504, analog receiver module 304 is initialized. This step comprises the steps of locking frequency synthesizers used for downconversion, locking gain scaling loops, and locking DC bias loops. These steps enable analog receiver module 304 to generate valid baseband signals from RF signals received through antenna segment 302. Performance of step 504 requires an initialization time.

A step 506 follows the performance of step 504. In step 506, searcher 330 searches PN offsets to find multipath transmission components. Step 506 comprises the step of, determining at each PN sequence offset whether a multipath component exists.

This step may be performed with signal processing techniques as would be apparent to persons skilled in the relevant art(s).

In a step 508, WCD 106 assigns each of the strongest multipath components identified in step 506 to a corresponding demodulation finger 332. In an embodiment, step 508 comprises the step of, for each demodulation finger 332, synchronizing PN sequence generator 344 and finger counter 342 to enable the despreading of the assigned multipath component.

Base stations 102 transmit sync channel(s) that enable WCDs 106 to achieve system synchronization. Thus, in a step 510, WCD 106 acquires and decodes a sync channel, thereby achieving synchronization with WCS 100.

In a step 512, WCD 106 initializes combiner counter 338. Step 512 comprises the step of setting combiner counter 338 to synchronously track a finger counter 342 at a predetermined delay equal to a number of PN sequence chips. This predetermined delay may be set to equal the depth of buffers 334.

A step 514 follows the performance of step 512. In step 514, WCD 106 shifts the sequences generated by PN sequence generators 344. This shifting is performed in accordance with the timing scheme described herein with reference to FIG. 4B. Step 514 may be performed by demodulation module 306 in conjunction with controller 312.

Next, in a step 516, WCD 106 decodes a paging channel. This step comprises the step of receiving base station originated messages that comprise a plurality of symbols. Reception of these messages includes obtaining signals through antenna segment 302, and converting these signals into a symbol stream through the operation of analog receiver module 304, demodulation module 306, deinterleaver module 308, and decoder module 310. Step 516 further comprises the steps of controller 312 receiving this symbol stream and identifying any component paging channel messages.

After performance of step 516, WCD 106 proceeds to process any received paging channel messages. In a step 518, WCD 106 determines whether a received paging message necessitates a transition into the active state. If so, operation proceeds to a step 540 for active state processing. Otherwise, operation proceeds to step 520 for further idle state processing. A ring message that notifies WCD 106 of an incoming call is an example of a paging channel message that necessitates such a transition into the active state. Step 518 is performed by controller 312.

A step 520 follows the performance of step 518. In step 520, WCD 106 determines whether there is additional paging traffic to decode. Thus, step 520 may comprise the step of determining whether a received paging channel message indicates that a further message is to be received. If there is an additional paging message to receive, steps 516 through 520 are preformed again. Otherwise, operation proceeds to a step 522.

In step 522, WCD 106 enters the sleep mode for a specific time interval. This specific time interval is greater than sleep intervals employed by conventional WCDs.

This reduces battery drain and advantageously extends the operational time of WCD 106. The performance of step 522 is described in greater detail herein with reference to FIG. 6.

After performance of step 522, a step 524 follows. In step 524, WCD 106 transitions into awake mode operation. Step 524 is described in greater detail herein with reference to FIG. 7. Once this transition into awake mode operation is complete, steps 516 through 524 are repeated. This cycle continues until WCD 106 either transitions into the active state, or is powered down.

VI. Sleep Mode Interval Timing

Combiner counter 338 may change the finger counter 342 to which it is synchronized. By employing this resynchronization feature with the finger timing scheme described herein with reference to FIG. 4B, the duration of WCD 106 sleep mode intervals may be controlled with greater precision than in conventional approaches. This greater precision enables WCD 106 to operate with longer sleep mode intervals, thereby extending its operational time.

When WCD 106 sleeps for a non-integer multiple of the PN sequence period, each phasor 454 is effectively "frozen" for the duration of the sleep interval. Upon a subsequent reentry into awake mode operation, each phasor 454 is effectively "rotated" about PN circle 452. For example, in an embodiment where demodulation module 306 employs four demodulation fingers 332, each separated at one quarter of a PN sequence period, if WCD 106 enters sleep mode operation for one quarter of a PN sequence period, then PN sequence generators 344 and finger counters 342 would be frozen for one quarter of a PN sequence period. Upon reentry of WCD 106 into awake mode operation, PN sequence generators 344 and finger counters 342 would be "rotated backwards" one quarter of a PN sequence period.

According to one approach, continued operation according to the synchronization of combiner counter 338 to the finger counter 342 employed during the previous awake mode would require the finger counter 342 and corresponding PN sequence generator 344 to be advanced by one quarter of a PN sequence period. However, since combiner counter 338 may change the finger counter 342 to which it is synchronized, the present invention eliminates the need to advance PN sequence generators 344 and finger counters 342 upon transitions into active mode operation.

Figure 6:
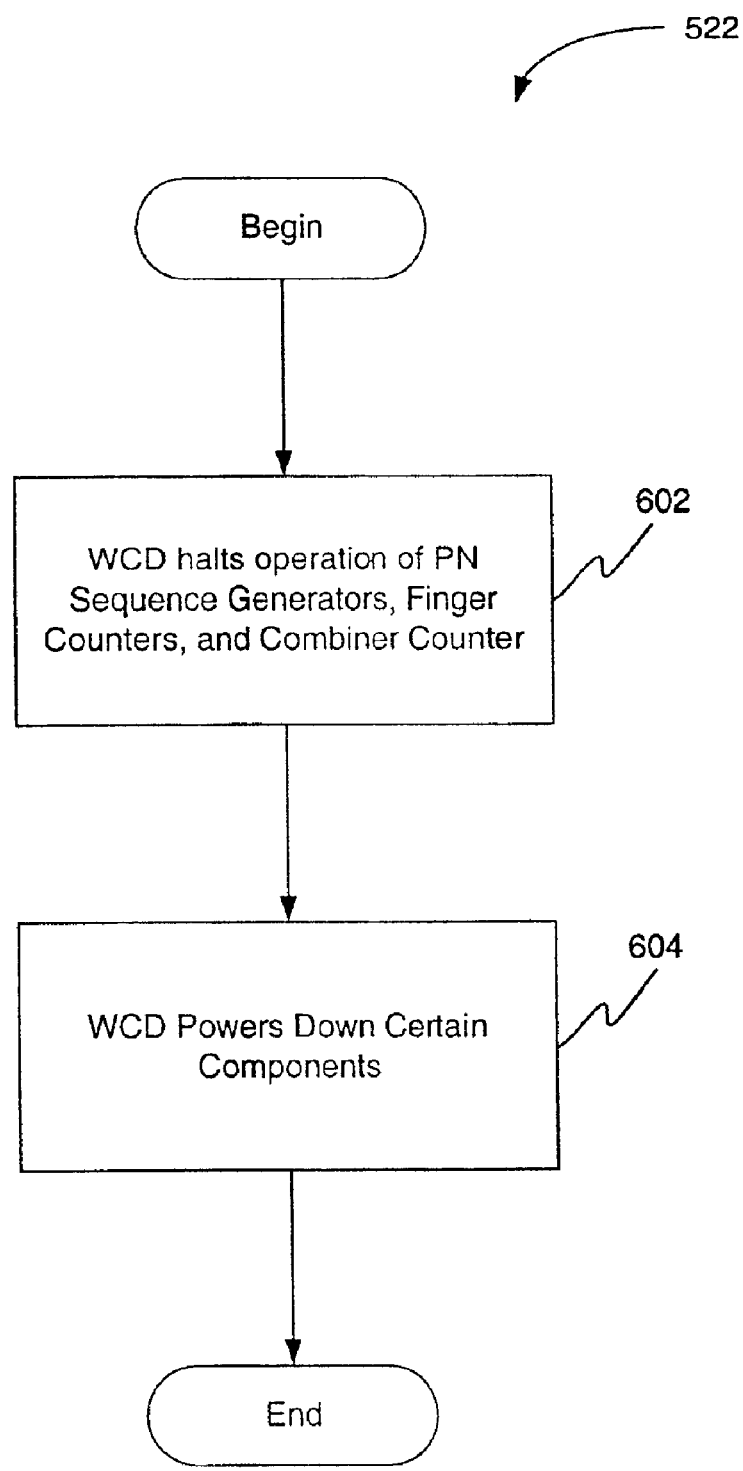
FIG. 6 is a flowchart illustrating an operation of entry into sleep mode operation.

FIG. 6 is a flowchart illustrating an operation of step 522 in greater detail. As described herein with reference to FIG. 5, in step 522, WCD 106 enters sleep mode operation for a specific time interval.

In a step 602, WCD 106 halts the operation of PN sequence generators 344, finger counters 342, and combiner counter 338. Once halted, the states of these components are frozen until a subsequent transition into awake mode operation. This step may be performed by controller 312. This halting occurs at the next occurrence of a finger counter 342 rollover. In an embodiment that employs the timing scheme described herein with reference to FIG. 4B, this halting step may be performed one quarter of a PN sequence period after the reception of one or more deinterleaver frames. In IS-95 systems, a deinterleaver frame is 20 milliseconds, and one quarter of a PN sequence period is 6.667 milliseconds.

Next, in a step 604, WCD 106 powers down certain electronic components for a sleep mode interval that lasts until a predetermined time before the beginning of the next paging channel slot 202 assigned to WCD 106. This predetermined time is needed to initialize components, such as decoder module 310, to proper operational states by providing them with information symbols. This predetermined time occurs at finger counter 342 rollover. In an embodiment employing the timing scheme described herein with reference to FIG. 4B, this rollover occurs at one half of a PN sequence period (13.333 milliseconds in IS-95 systems) before the beginning of the next paging channel slot 202 assigned to WCD 106.

Figure 7:
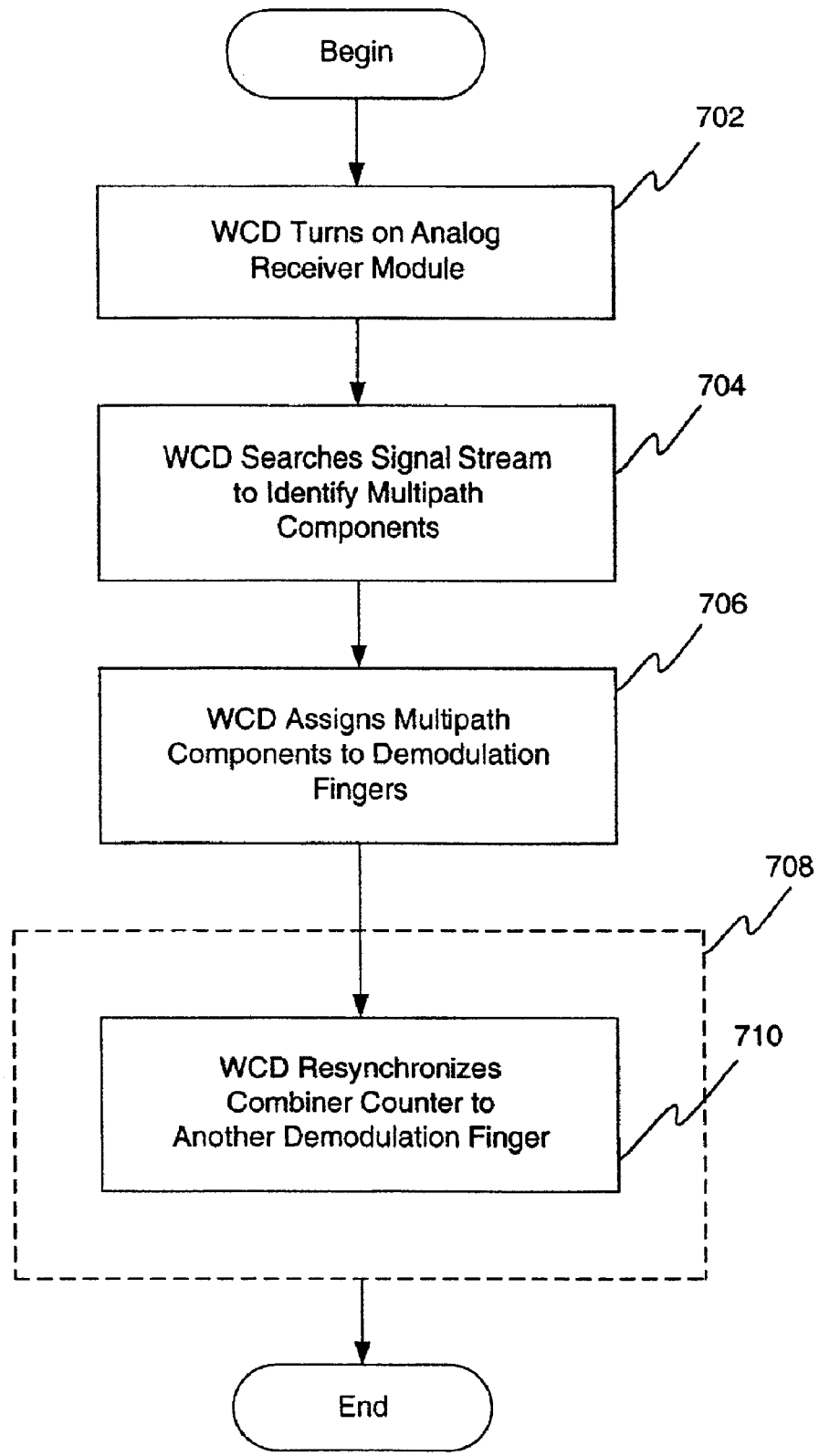
FIG. 7 is a flowchart illustrating an operation of a transition into awake mode operation.

FIG. 7 is a flowchart illustrating an operation of step 524 in greater detail. As described herein with reference to FIG. 5, in step 524, WCD 106 transitions into an awake mode.

Step 524 commences with a step 702. In step 702, WCD 106 turns on analog receiver module 304. This step comprises the steps of locking frequency synthesizer(s) used for downconversion, locking gain scaling loop(s), and locking DC bias loop(s). These steps enable analog receiver module 304 to generate valid baseband signals from RF signals received through antenna segment 302.

Next, in a step 704, WCD 106 searches the signal stream provided by analog receiver module 304 to identify multipath components. Step 704 is performed by searcher 330 of demodulation module 306. Since multipath propagation delays do not typically change rapidly, performance of step 704 may not require searching each PN offset. Instead, step 704 may comprise searching a plurality of PN offsets within a predetermined range from a previously employed PN offset.

In a step 706, WCD 106 assigns multipath components identified in step 704 to demodulation fingers 332.

After the performance of step 706 has been completed, WCD 106 enters awake mode operation, as illustrated in step 708. Awake mode operation 708 comprises a step 710 of resynchronizing combiner counter 338 to a finger counter 342 of another demodulation finger 332.

As described herein with reference to FIG. 6, awake mode operation 708 may commence one half of a PN sequence period before the beginning of the paging channel slot 202 assigned to WCD 106. To achieve this with the timing scheme described herein with reference to FIG. 4B, step 710 comprises the step of resynchronizing combiner counter 338 to a finger counter 342 that is out of phase by one-half of a PN sequence period (e.g., 13.333 milliseconds in IS-95 systems).

VII. A Method of Operational Time Extension

As described herein, the present invention enables sleep mode interval durations to be controlled with finer granularity. As a result of this finer granularity, these durations may be increased, thereby extending the operational time of a WCD.

Figure 8:
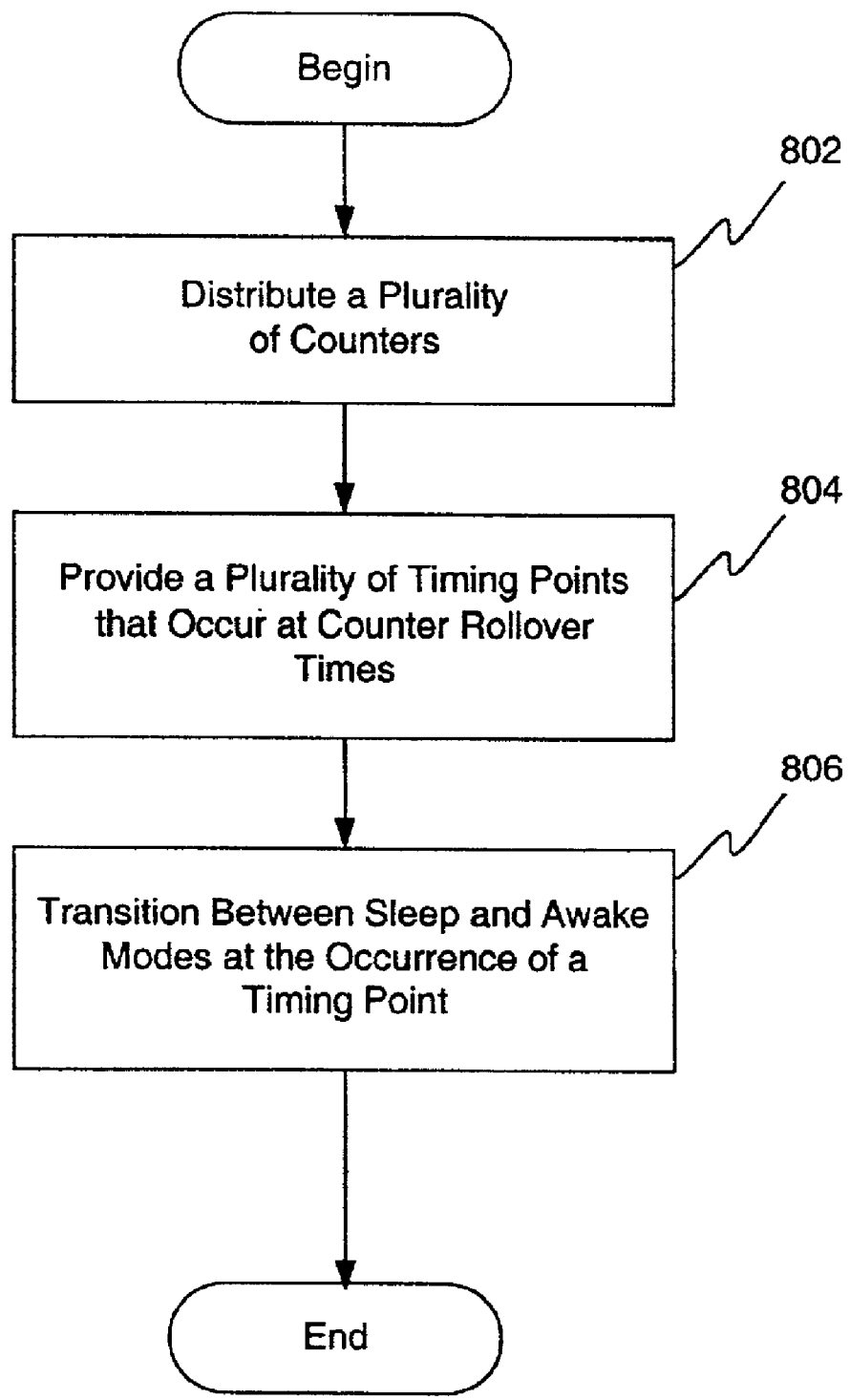
FIG. 8 is a flowchart illustrating a method of extending the operational time of a WCD.

FIG. 8 is a flowchart illustrating a method of extending the operational time of a WCD, such as WCD 106. This method begins with a step 802. In step 802, a plurality of counters, such as finger counters 342, are distributed so that each counter rolls over at a predetermined offset relative to each other counter. Step 802 comprises the step of spacing each of the plurality of counters at substantially equal time increments around a PN sequence period. For example, four counters may be spaced at one quarter PN sequence period increments, as described herein with reference to FIG. 4B.

Step 802 comprises the step of synchronizing each of the plurality of counters to a corresponding sequence generator, such as a PN sequence generator 344, as described herein with reference to FIG. 3B. This synchronizing step may comprise the step of shifting each of the corresponding sequence generators by an offset. As described herein with reference to FIG. 4B, this shifting step enables the sequence generator to demodulate a corresponding multipath transmission component.

In a step 804, a plurality of timing points are provided that occur at the roll over times for the plurality of counters that are distributed in step 802.

In a step 806, WCD 106 transitions between sleep and awake mode operation at the occurrence of one of the plurality of timing points provided in step 804.

Step 806 comprises the step of commencing awake mode operation at a predetermined number of timing points before the beginning of a paging channel slot assigned to WCD 106.

In a further embodiment, step 806 may comprise the step of commencing sleep mode operation at a predetermined number of timing points after the beginning of a paging channel slot assigned to WCD 106. This timing point may be the first occurring timing point after WCD 106 determines that there is no paging traffic to decode during a paging channel slot assigned to it.

VIII. Implementation

Figure 9:
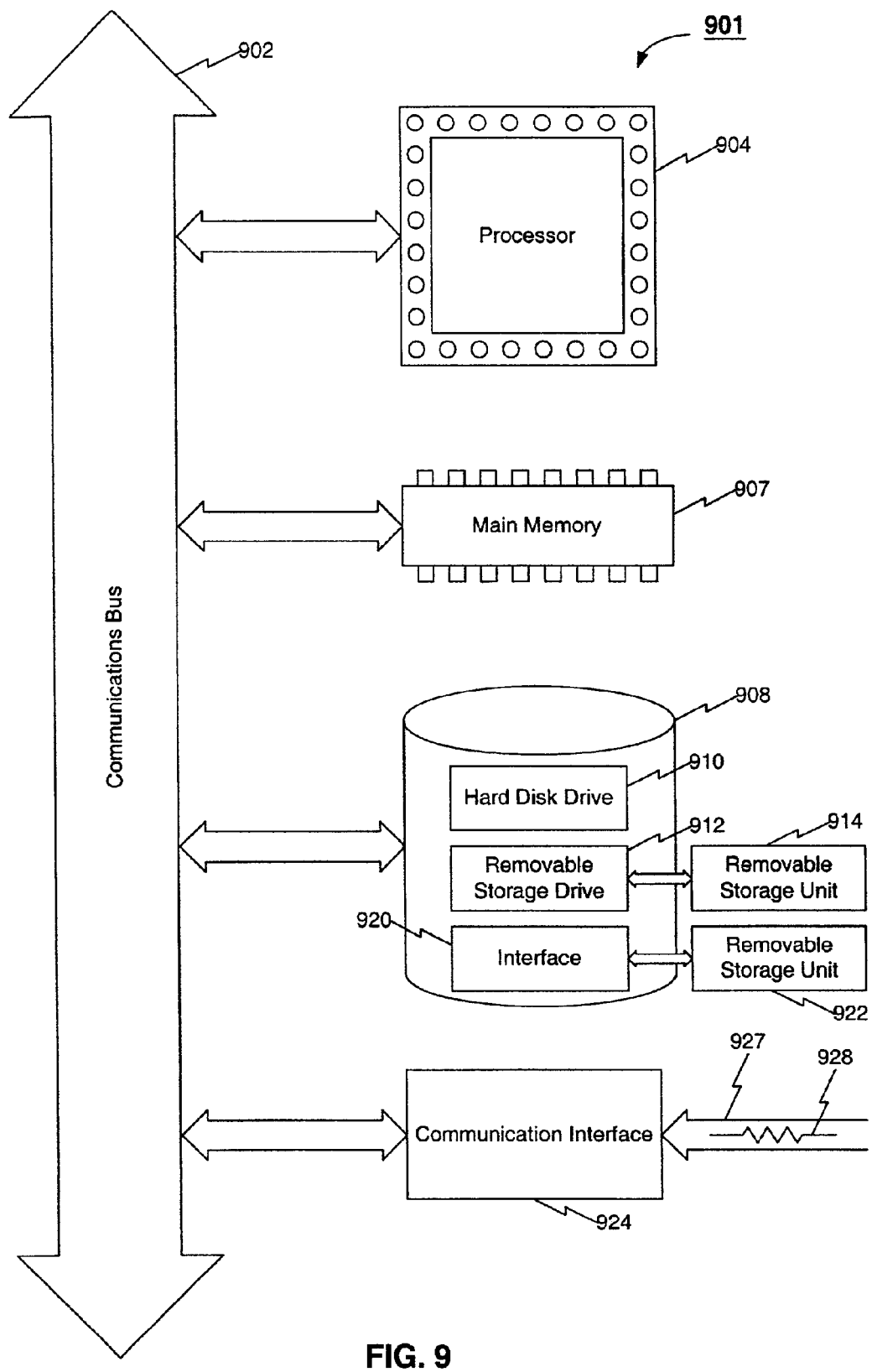
FIG. 9 is a block diagram of an exemplary computer system.

The functionality described herein may be implemented using hardware, software or a combination thereof and may be implemented in a computer system or other processing system. In fact, in one embodiment, the invention is directed toward a computer system capable of carrying out the functionality described herein. An exemplary computer system 901 is shown in FIG. 9. Computer system 901 includes one or more processors, such as a processor 904. The processor 904 is connected to a communication bus 902. Various software embodiments are described in terms of this example computer system. After reading this description, it will become apparent to persons skilled in the relevant art how to implement the invention using other computer systems and/or computer architectures.

Computer system 902 also includes a main memory 906, preferably random access memory (RAM), and can also include a secondary memory 908. The secondary memory 908 can include, for example, a hard disk drive 910 and/or a removable storage drive 912, representing a floppy disk drive, a magnetic tape drive, an optical disk drive, etc. The removable storage drive 912 reads from and/or writes to a removable storage unit 914 in a well known manner. Removable storage unit 914, represents a floppy disk, magnetic tape, optical disk, etc. which is read by and written to by removable storage drive 912. As will be appreciated, the removable storage unit 914 includes a computer usable storage medium having stored therein computer software and/or data.

In alternative embodiments, secondary memory 908 may include other similar means for allowing computer programs or other instructions to be loaded into computer system 901. Such means can include, for example, a removable storage unit 922 and an interface 920. Examples of such can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 901.

Computer system 901 can also include a communications interface 924. Communications interface 924 allows software and data to be transferred between computer system 901 and external devices. Examples of communications interface 924 can include a modem, a network interface (such as an Ethernet card), a communications port, a PCMCIA slot and card, etc. Software and data transferred via communications interface 924 are in the form of signals which can be electronic, electromagnetic, optical or other signals capable of being received by communications interface 924. These signals 926 are provided to communications interface via a channel 928. This channel 928 carries signals 926 and can be implemented using wire or cable, fiber optics, a phone line, a cellular phone link, an RF link and other communications channels.

In this document, the terms "computer program medium" and "computer usable medium" are used to generally refer to media such as removable storage device 912, a hard disk installed in hard disk drive 910, and signals 926. These computer program products are means for providing software to computer system 901.

Computer programs (also called computer control logic) are stored in main memory and/or secondary memory 908. Computer programs can also be received via communications interface 924. Such computer programs, when executed, enable the computer system 901 to perform the features of the present invention as discussed herein. In particular, the computer programs, when executed, enable the processor 904 to perform the features of the present invention. Accordingly, such computer programs represent controllers of the computer system 901.

In an embodiment where the invention is implemented using software, the software may be stored in a computer program product and loaded into computer system 901 using removable storage drive 912, hard drive 910 or communications interface 924. The control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software. Examples of such combinations include, but are not limited to, microcontrollers.

IX. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of reducing average power consumption in a wireless communication device (WCD), the WCD operating in sleep and awake modes during monitoring of a slotted paging channel, comprising:

providing a plurality of equal periods;

establishing a roll over point for each counter at a predetermined offset relative to each other counter to establish substantially equal time increments around a pseudoniose (PN) sequence period between adjacent roll over points;

identifying a timing point for at least one roll over point; and transitioning between the sleep and awake modes during the occurrence of an identified timing point.

2. The method of claim 1, wherein establishing a roll over point comprises synchronizing each of the plurality of counters to a corresponding pseudonoise (PN) sequence generator.

3. The method of claim 2, wherein synchronizing each of the plurality of counters to a corresponding pseudonoise (PN) sequence generator comprises shifting each of the corresponding PN sequence generators by an offset, thereby enabling the demodulation of a corresponding multipath transmission component.

4. The method of claim 1, wherein transiting between the sleep and awake modes comprises commencing awake mode operation at a predetermined number of timing points before the beginning of a paging channel slot assigned to the WCD.

5. The method of claim 1, wherein transitioning between the sleep and awake modes comprises commencing sleep mode operation at a predetermined number of timing points after the beginning of a paging channel slot assigned to the WCD.

6. The method of claim 1, wherein transitioning between the sleep and awake modes comprises commencing awake mode operation two timing points before the beginning of a paging channel slot assigned to the WCD.

7. The method of claim 1, wherein transitioning between the sleep and awake modes comprises commencing sleep mode operation at a first occurring timing point after the WCD determines there is no paging traffic to decode during a paging channel slot assigned to the WCD.

8. The method of claim 1, wherein the slotted paging channel carries code division multiple access (CDMA) signals.

9. The method of claim 8; wherein the slotted paging channel operates in accordance with IS-95.

10. A Wireless Communications Device (WCD) with reduced power consumption, the WCD operating in sleep and awake modes during monitoring of a slotted paging channel comprising:

a plurality of counters of substantially equal periods, each counter having a roll over point at a predetermined offset relative to each other counter to establish substantially equal time increments around a pseudonoise (PN) sequence period between adjacent roll over points;

a plurality of timing points that occur at the roll over times for the plurality of counters; and a controller that transitions the WCD between sleep and awake mode operation at the occurrence of one of the plurality of timing points.

11. The device of claim 10, wherein each of the counters are synchronized to a corresponding pseudonoise (PN) sequence generator.

12. The device of claim 11, wherein each of the corresponding PN sequence generators are shifted by an offset, thereby enabling the demodulation of a corresponding multipath transmission component.

13. The device of claim 10, wherein the controller commences awake mode operation at a predetermined number of timing points before the beginning of a paging channel slot assigned to the WCD.

14. The device of claim 10, wherein the controller commences sleep mode operation at a predetermined number of timing points after the beginning of a paging channel slot assigned to the WCD.

15. The device of claim 10, wherein the controller commences awake mode operation two timing points before the beginning of a paging channel slot assigned to the WCD.

16. The device of claim 10, wherein the controller commences sleep mode operation at a first occurring timing point after the WCD determines there is no paging traffic to decode during a paging channel slot assigned to the WCD.

17. The device of claim 10, wherein the slotted paging channel carries code division multiple access (CDMA) signals.

18. The device of claim 17, wherein the slatted paging channel operates in accordance with IS-95.

19. A Wireless Communications Device (WCD) with reduced power consumption, the WCD open in sleep and awake modes during monitoring of a slotted paging channel, comprising:

means for providing a plurality of counters of substantially equal periods;

means for establishing a roll over point for each counter at a predetermined offset relative to each other counter to establish substantially equal time increments around a pseudonoise (PN) sequence period between adjacent roll over points;

means for identifying a timing point for at least one roll over point; and means for transitioning between the sleep and awake modes during the occurrence of an identified timing point.

20. A computer program product comprising computer program logic for enabling a processor in a computer system to reduce average power consumption in a wireless communications device (WCD), the WCD operating in sleep and awake modes during monitor of a slotted pang channel, comprising:

means for enabling the processor or to provide a plurality of counters of substantially equal periods;

means for enabling the processor to establish a roll over point for each counter at a predetermined offset relative to each other counter to establish substantially equal time increments around a pseudonoise (PN) sequence period between adjacent roll over points;

means for enabling the processor to identify a timing point for at least one roll over point; and means for enabling the processor to transition between the sleep and awake modes during the occurrence of an identified timing point.

* * * * *

UNITED STATES PATENT AND TRADEMARK OFFICE
CERTIFICATE OF CORRECTION

PATENT NO. : 6,889,055 B1
DATED : May 3, 2005
INVENTOR(S) : Arthur James Neufeld It is certified that error appears in the above-identified patent and that said Letters Patent is hereby corrected as shown below:

Title page,
Item [74], *Attorney, Agent, or Firm*, should read -- - Philip R. Wadsworth; Charles D. Brown; Kenyon Jenckes --.

Signed and Sealed this

Sixteenth Day of August, 2005

JON W. DUDAS
*Director of the United States Patent and Trademark Office*